No. 874,607.
PATENTED DEC. 24, 1907.
J. B. LOYND.
KETTLE FILLER.
APPLICATION FILED JULY 3, 1907.
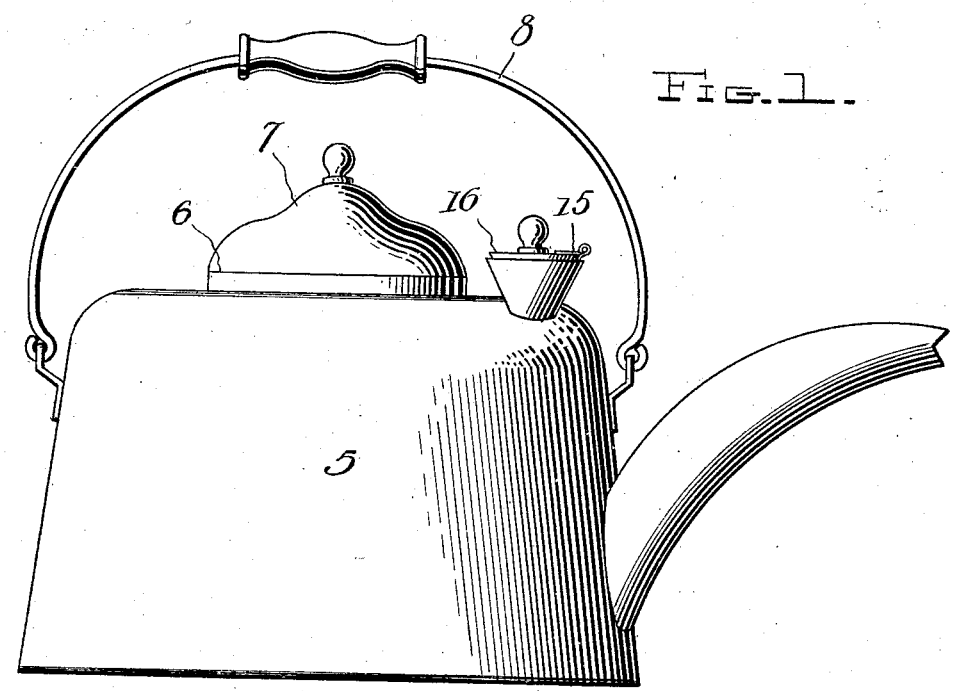
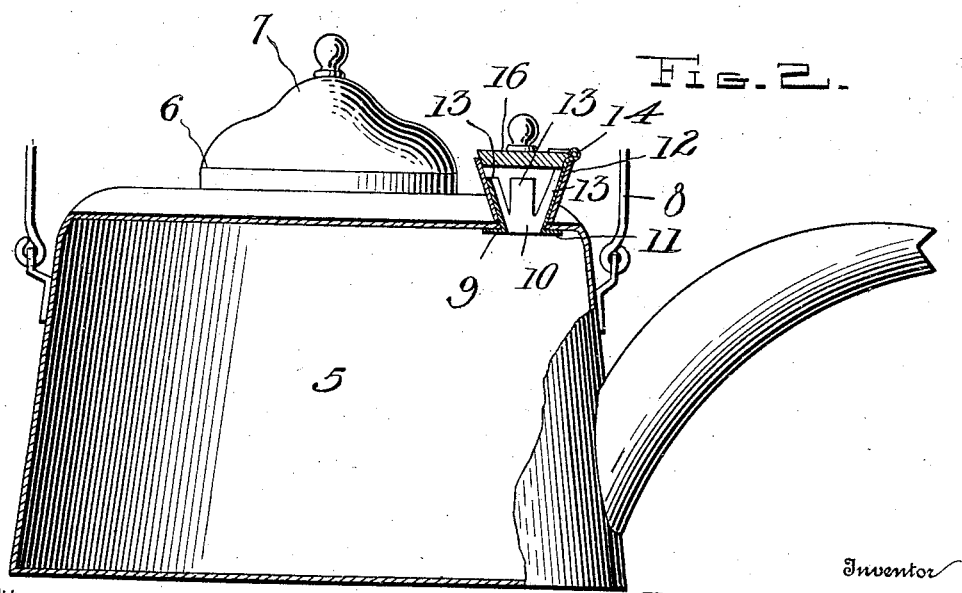
Witnesses
Inventor
John B. Loynd,
By
Attorneys

UNITED STATES PATENT OFFICE.

JOHN B. LOYND, OF WEST PHILADELPHIA, PENNSYLVANIA.

KETTLE-FILLER.

No. 874,607.

Specification of Letters Patent.

Patented Dec. 24, 1907.

Application filed July 3, 1907. Serial No. 382,021.

*To all whom it may concern:*

Be it known that JOHN B. LOYND, a citizen of the United States, residing at 4891½ Merion avenue, West Philadelphia, in the county of Philadelphia and State of Pennsylvania, has invented certain new and useful Improvements in Kettle-Fillers, of which the following is a specification.

This invention relates to kettles, and more particularly to attachments therefor, and has for its object to provide a filling attachment for kettles by means of which a kettle may be filled without removing the lid therefrom with the consequent result of steaming the hand holding the bail of the kettle.

Another object is to provide an attachment of this kind which will be extremely simple and which may be readily applied to tin kettles, without the use of solder or similar attaching means.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a view showing a kettle provided with the present attachment; Fig. 2 is a section through the kettle and the attachment.

Referring now to the drawings, there is shown a kettle including a body portion 5, having the usual opening 6 in its top provided with a cover 7 and lying beneath the supporting bail 8 of the kettle. An opening 9 is formed through the top of the kettle and adjacent to one end of the bail, and a tube 10 is engaged through the opening 9 and has a retaining flange 11 at its inner end engaging the under surface of the top.

A funnel 12 surrounds the tube 10 above the top of the kettle, and within this funnel, the tube 10 is split and the resultant tongues 13 are bent outwardly to engage the inner surface of the funnel and the tube and funnel are thus held in position. One of the tongues 13 is continued upwardly and outwardly of the funnel, at which point it is bent to form an eye 14 receiving a hinge loop 15 carried by a cover 16 for the funnel. It will thus be seen that when the kettle is to be filled, the cover 16 is raised and water is poured into the funnel or allowed to run thereinto from the faucet and thus the kettle may be filled without exposing the hand holding the bail 8 to the steam arising from the opening 6 should the cover 7 be removed. By reason of the fact that the opening 9 is located adjacent to one end of the bail 8, the kettle is prevented from tilting laterally during the filling operation.

What is claimed is:

1. The combination with a receptacle having an opening therein, of a tube engaged in said opening and having a retaining flange at its inner end, a funnel surrounding the tube outwardly of the receptacle, said tube being split to form resultant tongues within the funnel to hold the funnel against removal, and a lid for the funnel.

2. The combination with a receptacle having an opening therein, of a tube engaged in said opening and having a retaining flange at its inner end, and a funnel surrounding the tube outwardly of the receptacle, said tube being split within the funnel to form tongues to hold the funnel against removal.

In testimony whereof I affix my signature in presence of two witnesses.

JOHN B. LOYND.

Witnesses:
W. J. A. GALLEN,
WILLIAM GAGHAN